United States Patent
Nishida

(10) Patent No.: US 11,519,499 B2
(45) Date of Patent: Dec. 6, 2022

(54) TRANSMISSION CONTROL DEVICE

(71) Applicant: TOYOTA JIDOSHA KABUSHIKI KAISHA, Toyota (JP)

(72) Inventor: Naofumi Nishida, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/570,475

(22) Filed: Jan. 7, 2022

(65) Prior Publication Data
US 2022/0275863 A1 Sep. 1, 2022

(30) Foreign Application Priority Data
Feb. 26, 2021 (JP) .............................. JP2021-031116

(51) Int. Cl.
*F16H 61/30* (2006.01)
*F16H 61/00* (2006.01)

(52) U.S. Cl.
CPC ..... *F16H 61/30* (2013.01); *F16H 2061/0084* (2013.01)

(58) Field of Classification Search
CPC .......................... F16H 61/30; F16H 2061/0084
See application file for complete search history.

(56) References Cited

U.S. PATENT DOCUMENTS

2018/0149551 A1* 5/2018 Okajima ............. G01M 3/2807

FOREIGN PATENT DOCUMENTS

| CN | 109563927 | A | * | 4/2019 | ......... F16H 61/0025 |
| CN | 111947900 | A | * | 11/2020 | ............... F04B 19/12 |
| DE | 102005007406 | A1 | * | 8/2006 | ............... F01M 1/16 |
| JP | 2011-052752 | A | | 3/2011 | |

* cited by examiner

*Primary Examiner* — Tisha D Lewis
(74) *Attorney, Agent, or Firm* — Oliff PLC

(57) ABSTRACT

An output is calculated using, as an input, a measured value of a pump discharge pressure in a neural network having the pump discharge pressure as the input and a pump rotational speed as the output. A leakage degree of oil of the hydraulic circuit of a transmission is estimated based on a difference obtained by subtracting a measured value of the pump rotational speed from the calculated value of the output. Learning of the neural network is performed using, as teacher data, the measured values of the pump discharge pressure and the pump rotational speed in the transmission in which the leakage degree of oil is within an allowable range.

9 Claims, 4 Drawing Sheets

TRANSMISSION CONTROL DEVICE

CROSS-REFERENCE TO RELATED APPLICATION

This application claims priority to Japanese Patent Application No. 2021-031116 filed on Feb. 26, 2021, incorporated herein by reference in its entirety.

BACKGROUND

1. Technical Field

The present disclosure relates to a transmission control device for controlling a hydraulically driven transmission mounted on a vehicle.

2. Description of Related Art

As a transmission installed in a power transmission path from a drive power source to wheels in a vehicle, a hydraulically driven transmission is known. Such a transmissions includes a hydraulic circuit. The hydraulic circuit includes an oil pump, a speed change mechanism, and a hydraulic pressure control mechanism. The oil pump operates by receiving a rotational force input from the drive power source to the transmission, and discharges oil by pressurizing. The speed change mechanism performs shift operation by receiving supply of oil. The hydraulic pressure control mechanism controls the amount of oil supplied from the oil pump to the speed change mechanism.

As the device for controlling a transmission including a hydraulic circuit, a transmission control device described in Japanese Unexamined Patent Application Publication No. 2011-52752 (JP 2011-52752 A) is known. The transmission control device described in JP 2011-52752 A is applied to a continuously variable transmission capable of changing the gear ratio steplessly. While the vehicle is traveling, the transmission control device determines whether the discharge flow rate of oil of the oil pump is equal to or higher than the required flow rate that is a flow rate of oil required for the shift operation of the speed change mechanism. When the discharge flow rate of the oil pump is lower than the required flow rate, the transmission control device changes the gear ratio of the continuously variable transmission such that the output rotational speed of the drive power source increases, thereby eliminating the shortage of the discharge flow rate of oil of the oil pump.

SUMMARY

When oil leakage of the hydraulic circuit increases due to deterioration over time, oil of sufficient flow rate may not reach the speed change mechanism even if the discharge flow rate of the oil pump is equal to or higher than the required flow rate. Therefore, it is necessary to accurately know the leakage degree of oil of the hydraulic circuit in order to properly perform the shift control.

In order to solve the above issues, a transmission control device controls a transmission mounted on a vehicle and equipped with a hydraulic circuit including an oil pump, a speed change mechanism that operates by receiving supply of oil to perform a shift operation of the transmission, and a hydraulic pressure control mechanism that controls an amount of oil supplied from the oil pump to the speed change mechanism. The transmission control device includes an execution device and a storage device. Here, one of a state quantity indicating a discharge flow rate of oil of the oil pump and a state quantity indicating a discharge pressure of oil of the oil pump is an input-side evaluation state quantity and another is an output-side evaluation state quantity. A neural network having the input-side evaluation state quantity as an input and the output-side evaluation state quantity as an output is stored in the storage device. Learning of the neural network is performed using, as teacher data, a measured value of the input-side evaluation state quantity in the transmission in which a leakage degree of oil is within an allowable range and a measured value of the output-side evaluation state quantity at a time of measurement of the input-side evaluation state quantity. The execution device in the transmission control device executes the following processes. That is, the execution device executes a measurement process of measuring the input-side evaluation state quantity and the output-side evaluation state quantity, an arithmetic process of calculating an output of the neural network using the measured value of the input-side evaluation state quantity in the measurement process as the input, an estimation process of estimating the leakage degree of the hydraulic circuit based on a difference between a calculated value of the output of the neural network in the arithmetic process and the measured value of the output-side evaluation state quantity in the measurement process, and an output process of outputting an estimation result of the leakage degree in the estimation process.

When the oil leakage of the hydraulic circuit increases, the discharge pressure of the oil pump is less likely to increase. That is, when the oil leakage progresses, the discharge pressure of the oil pump obtained under the same discharge flow rate is lower than that in the case where there is no oil leakage. On the other hand, the calculated value of the output of the neural network is an output-side evaluation value when the leakage degree of oil of the hydraulic circuit is assumed to be within an allowable range and an input-side evaluation value corresponding to the measured value input to the neural network can be obtained. Therefore, a difference obtained by subtracting the measured value of the output-side evaluation value from the calculated value of the output of the neural network is a value indicating the leakage degree of oil of the hydraulic circuit. Thus, with the transmission control device described above, the leakage degree of oil in the hydraulic circuit can be accurately estimated.

In an oil pump of a gear type and the like, the discharge flow rate of oil is proportional to the rotational speed of the oil pump. Therefore, when an oil pump having a proportional relationship between the discharge flow rate and the rotational speed is adopted, the rotational speed of the oil pump may be used as the state quantity indicating the discharge flow rate of oil of the oil pump. In contrast, when a variable displacement pump that changes the discharge flow rate of oil in accordance with a command is adopted as the oil pump, the command value of the discharge flow rate may be used as the state quantity indicating the discharge flow rate of oil of the oil pump.

The relationship between the discharge flow rate and the discharge pressure of the oil pump also changes with changes in oil viscosity due to oil temperature and deterioration. The transmission control device may be implemented in an aspect where: the input of the neural network includes a viscosity state quantity that is a state quantity correlating to a viscosity of oil; the teacher data includes the input-side evaluation state quantity included in the teacher data and a measured value of the viscosity state quantity at a time of measurement of a value of the output-side evaluation state quantity; in the measurement process, measurement of the value of the viscosity state quantity is also performed; and a value input to the neural network for calculation in the arithmetic process includes a measured value of the viscosity state quantity in the measurement process. In such a case, the leakage degree of oil can be estimated in a state in which the influence of the viscosity of oil on the relationship between the discharge flow rate and the discharge pressure of the oil pump is incorporated. The viscosity of oil changes due to the temperature and the deterioration thereof. Therefore, the temperature of oil can be regarded as the viscosity state quantity. The viscosity state quantity may be a state quantity indicating the deterioration degree of oil. An example of the state quantity indicating the deterioration degree of oil is the retention time of the temperature of oil for each of temperature ranges after start of use of oil.

The transmission control device may be implemented in an aspect where: the input of the neural network includes a value of a clearance between components of the hydraulic circuit; the teacher data includes the input-side evaluation state quantity in the teacher data and a measured value of the clearance of the transmission for which the measured value of the output-side evaluation state quantity is measured; the measured value of the clearance of the transmission for which the transmission control device estimates the leakage degree in the estimation process is stored in the storage device; and a value input to the neural network for calculation in the arithmetic process includes the measured value of the clearance stored in the storage device. There are variations in the clearance between the components of the hydraulic circuit due to machining tolerances. The difference in the clearance affects the oil flow in the hydraulic circuit. That is, the relationship between the discharge flow rate and the discharge pressure of the oil pump may also change due to the difference in the clearance. Therefore, according to the above aspect, the leakage degree of oil can be estimated in a state in which the influence of the variation in the clearance on the relationship between the discharge flow rate and the discharge pressure of the oil pump is incorporated.

The transmission control device may be implemented in an aspect where: the input of the neural network includes a speed change flow rate that is a flow rate of oil reaching the speed change mechanism during the shift operation; the teacher data includes the input-side evaluation state quantity in the teacher data and a measured value of the speed change flow rate of the transmission for which a value of the output-side evaluation state quantity is measured; and a value input to the neural network for calculation in the arithmetic process includes the measured value of the speed change flow rate of the transmission for which the transmission control device estimates the leakage degree in the estimation process. The speed change flow rate has variations due to machining tolerances of the components of hydraulic circuit. Further, the speed change flow rate may change due to change over time in the cylinder volume of the speed change mechanism due to wear and the like. The difference in the speed change flow rate changes the relationship between the discharge flow rate and the discharge pressure of the oil pump. Therefore, according to the above aspect of the transmission control device, the leakage degree of oil can be estimated in a state in which the influence of individual differences of the speed change flow rate and change over time on the relationship between the discharge flow rate and the discharge pressure of the oil pump is incorporated.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment of a transmission control device will be described in detail with reference to FIGS. 1 to 5.

Configuration of Power Transmission System of Vehicle

Figure 1:
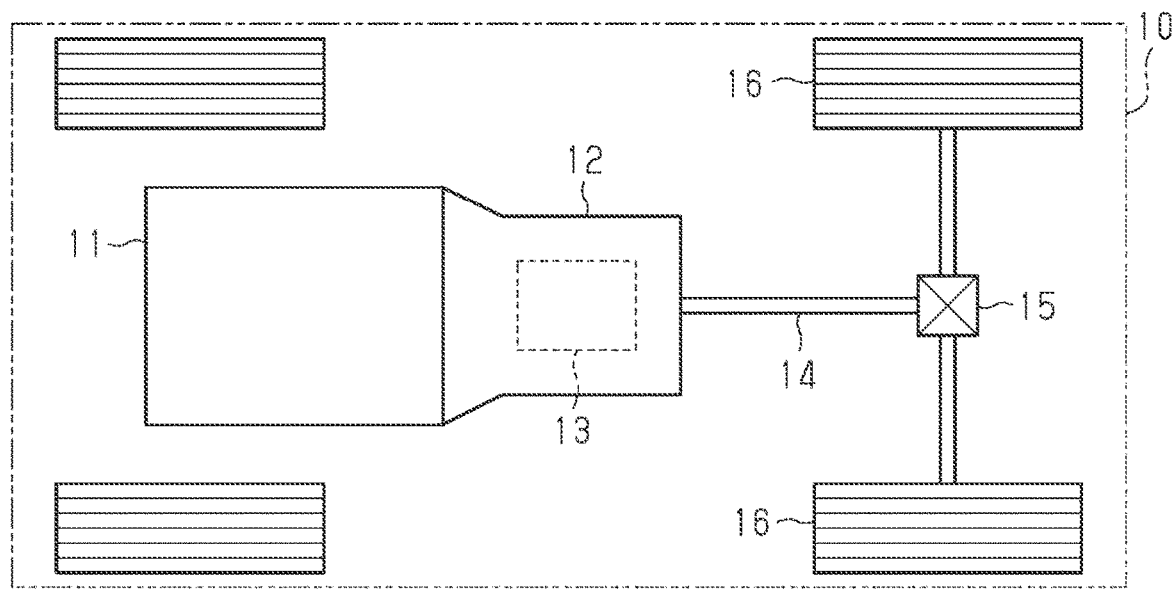
FIG. 1 is a diagram schematically showing a configuration of a power transmission system of a vehicle on which an embodiment of a transmission control device is mounted.

First, with reference to FIG. 1, a configuration of a power transmission system of a vehicle 10 on which the transmission control device of the present embodiment is mounted will be described. On the vehicle 10, an engine 11 serving as a driving source is mounted. The engine 11 is coupled to the transmission 12. The transmission 12 is a hydraulically driven multi-stage transmission, and includes a hydraulic circuit 13. The output side of the transmission 12 is connected to right and left drive wheels 16 via a propeller shaft 14 and a differential 15.

Configuration of Hydraulic Circuit

Figure 2:
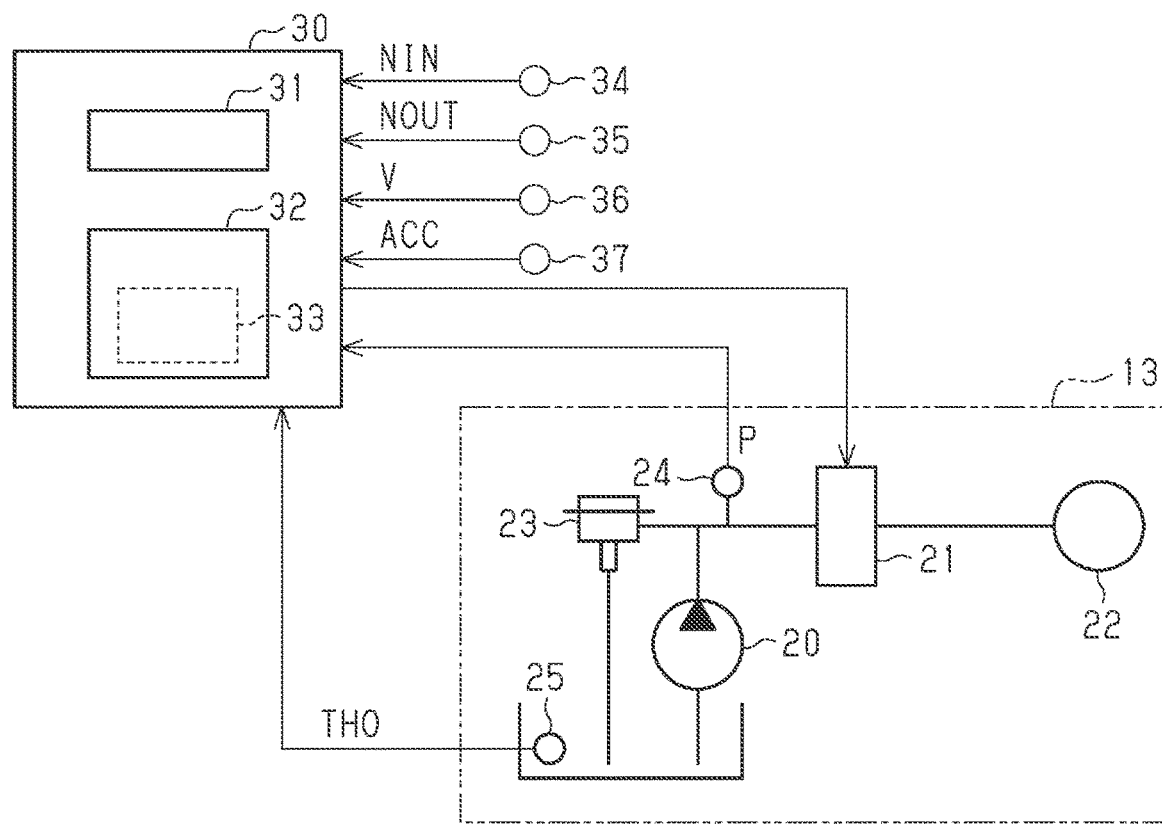
FIG. 2 is a diagram schematically showing a configuration of the transmission control device and a hydraulic circuit.

Next, the configuration of the hydraulic circuit 13 of the transmission 12 will be described with reference to FIG. 2. The hydraulic circuit 13 includes an oil pump 20, a hydraulic pressure control mechanism 21, and a speed change mechanism 22. The oil pump 20 operates by receiving a rotational force input from the engine 11 to the transmission 12. The oil pump 20 pressurizes and discharges oil in accordance with the operation. The speed change mechanism 22 is provided with a plurality of frictional engagement elements such as clutches and brakes that operate by receiving supply of oil. The hydraulic pressure control mechanism 21 includes a pressure regulation valve for regulating oil discharged by the oil pump 20 to a predetermined line pressure and a plurality of solenoid valves for switching supply and discharge of the oil with the line pressure to the speed change mechanism 22. The hydraulic pressure control mechanism 21 controls the amount of oil supplied from the oil pump 20 to the speed change mechanism 22. In the transmission 12 including the hydraulic circuit 13, the gear stages are switched in accordance with a combination of elements that are engaged, out of the frictional engagement elements provided in the speed change mechanism 22.

In the present embodiment, as the oil pump 20, a gear pump is adopted that pressurizes and discharges oil with the rotation of the pump gear housed in a pump body. The oil discharge amount of the gear-type oil pump 20 is generally proportional to the rotational speed of the pump gear. Further, in the oil pump 20 of the present embodiment, the pump gear is connected to the input shaft of the transmission 12. The pump gear of the oil pump 20 rotates integrally with the input shaft of the transmission 12.

Moreover, the hydraulic circuit 13 of the transmission 12 is provided with a hydraulic pressure sensor 24 for detecting a pump discharge pressure P that is a discharge pressure of oil of the oil pump 20. Furthermore, the hydraulic circuit 13 is provided with an oil temperature sensor 25 for detecting an oil temperature THO that is a temperature of oil. In addition, the hydraulic circuit 13 is provided with a pressure regulator 23 for maintaining the pump discharge pressure P of the oil pump 20 at a pressure equal to or lower than a predetermined regulator pressure.

Configuration of Transmission Control Device

Next, the configuration of the transmission control device 30 of the present embodiment will be described with reference to FIG. 2. The transmission control device 30 is an electronic control unit including an arithmetic processing circuit 31 and a memory 32. The arithmetic processing circuit 31 is an execution device that executes various processes related to the control of the transmission 12. The memory 32 is a storage device in which programs and data for controlling the transmission 12 are stored. The neural network 33 that is used for estimating the leakage degree of oil of the hydraulic circuit 13 described later is also stored in the memory 32. The arithmetic processing circuit 31 reads a program from the memory 32 and executes the program, thereby performing various processes described later.

Outputs of the hydraulic pressure sensor 24 described above and the oil temperature sensor 25 are input to the transmission control device 30. Outputs of the rotational speed sensors 34 and 35 installed in the transmission 12 are also input to the transmission control device 30. The rotational speed sensor 34 is a sensor for detecting an input rotational speed NIN of the transmission 12. The rotational speed sensor 35 is a sensor for detecting an output rotational speed NOUT of the transmission 12. An output of a vehicle speed sensor 36 for detecting a vehicle speed V and an output of an accelerator pedal sensor 37 for detecting an accelerator pedal operation amount ACC are input to the transmission control device 30. Based on the outputs of the sensors, the transmission control device 30 controls the transmission 12. For example, based on the vehicle speed V and the accelerator pedal operation amount ACC, the transmission control device 30 performs the shift control of the transmission 12. In the shift control, first, based on the vehicle speed V and the accelerator pedal operation amount ACC, the transmission control device 30 determines a target gear stage that is a target value of the gear stage of the transmission 12. A shift map stored in the memory 32 in advance is used to determine the target gear stage. The value of the target gear stage for each value of the vehicle speed V and the accelerator pedal operation amount ACC is stored in the shift map. In order to engage the frictional engagement elements necessary for achieving the target gear stage, the transmission control device 30 performs the shift control of the transmission 12 by operating the hydraulic pressure control mechanism 21.

Configuration of Neural Network

Figure 3:
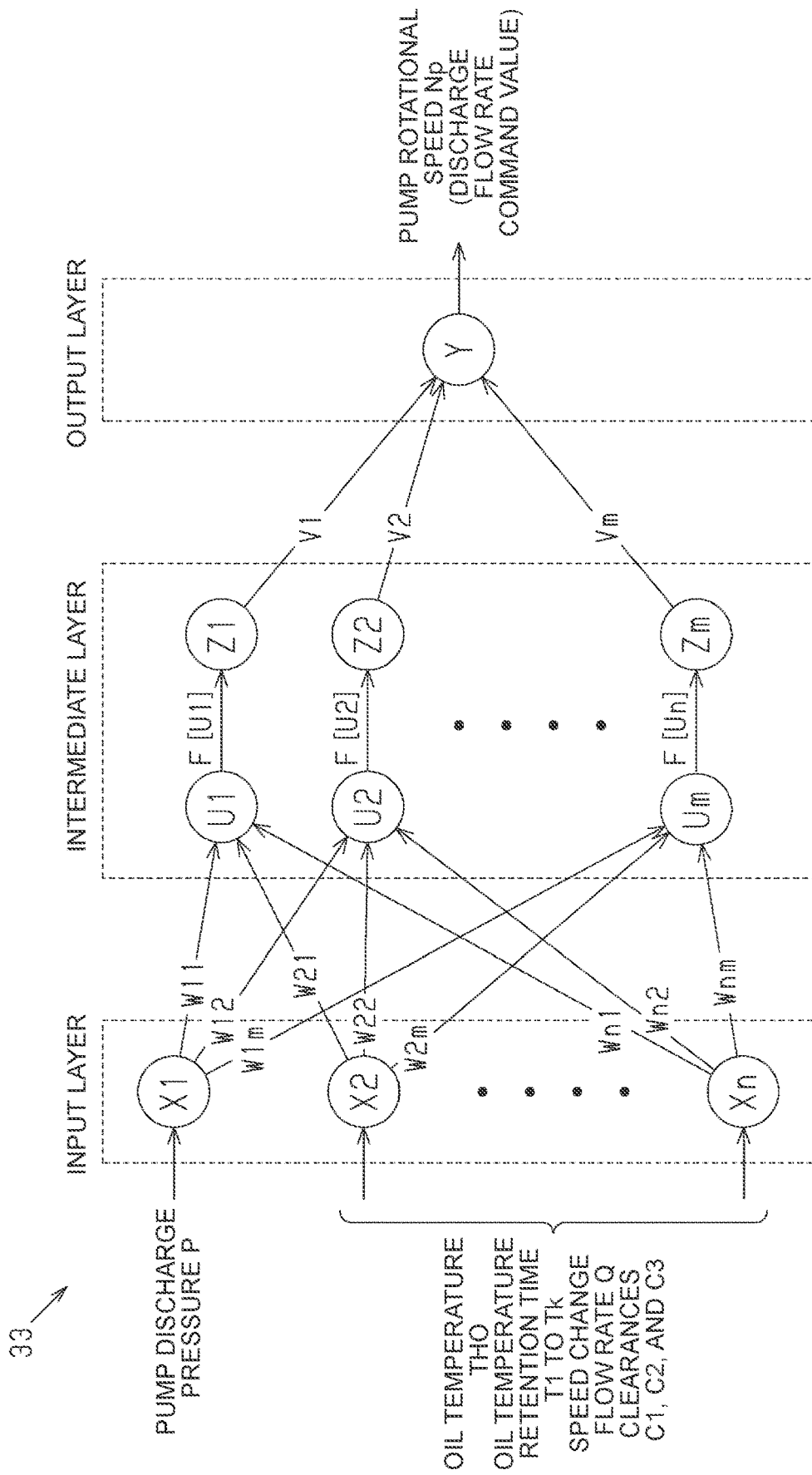
FIG. 3 is a diagram schematically showing a configuration of a neural network that the transmission control device uses to estimate a leakage degree of oil.

Next, the configuration of the neural network 33 stored in the memory 32 will be described with reference to FIG. 3. As shown in FIG. 3, the neural network 33 includes an input layer with n nodes, an intermediate layer with m nodes, and an output layer with one node. In the following description, "i" represents any integer equal to or more than 1 and equal to or less than "n." Further, "j" in the following description represents any integer equal to or more than 1 and equal to or less than "m".

In FIG. 3, input values of the nodes of the input layer are denoted as $X1, X2, \ldots, Xn$. The input value $X1$ is the pump discharge pressure P. The input values $X2, \ldots, Xn$ are an oil temperature THO, oil temperature retention times $T1$ to $Tk$, a speed change flow rate Q, clearances $C1$, $C2$, and $C3$.

In the present embodiment, the range of the temperature that the oil temperature THO can take in the vehicle 10 is divided into "k" temperature ranges. Respective retention times of the oil temperature THO for the temperature ranges during the period from the start of use of oil to the present time are the oil temperature retention times $T1$ to $Tk$. While the vehicle 10 is traveling, based on the measurement result of the oil temperature THO by the oil temperature sensor 25, the transmission control device 30 updates the values of the oil temperature retention times $T1$ to $Tk$.

The speed change flow rate Q indicates a flow rate of oil reaching the speed change mechanism 22 during the shift operation. The transmission control device 30 measures the shift time that is the time from the start of the shift operation of the speed change mechanism 22 to the completion of the shift operation, at the time of switching of the gear stage of the transmission 12. In the present embodiment, a point in time of issuing a command for the shift operation to the hydraulic pressure control mechanism 21 is defined as a time of the start of the shift operation. Further, the time when it is confirmed that the switching of the gear stage of the transmission 12 has been completed based on the detected values of the input rotational speed NIN and the output rotational speed NOUT is defined as a time of the completion of the shift operation. The transmission control device 30 obtains the quotient obtained by dividing a cylinder volume of the frictional engagement elements constituting the speed change mechanism 22 by the shift time as the value of the speed change flow rate Q. The value of the cylinder volume in the design specification is used for calculation of the speed change flow rate Q. On the other hand, the cylinder volume varies by each transmission 12 due to machining tolerances. The cylinder volume also varies with wear of the frictional engagement elements. Even if the flow rate of oil reaching the speed change mechanism 22 is identical, the shift time differs if the cylinder volume is different. Therefore, the values of the speed change flow rate Q reflect individual differences in the cylinder volume and the change over time.

The clearances $C1$, $C2$, and $C3$ indicate the values of the clearances at portions where a difference in clearance between the components has a large influence on the flow of oil in the hydraulic circuit 13. For example, the clearance $C1$ indicates a clearance between the pump body and the pump gear in the oil pump 20. The clearance $C2$ indicates a clearance between the valve element and the valve body in the solenoid valve of the hydraulic pressure control mechanism 21. The clearance $C3$ indicates a clearance between: a seal ring interposed between the oil pump 20 and the case of the transmission 12; and a ring groove in which the seal ring is fitted. The values of the clearances $C1$, $C2$, and $C3$ measured at the time of shipment of the transmission 12 from the factory are stored in advance in the memory 32 of the transmission control device 30.

In FIG. 3, the input values of the nodes of the intermediate layer are denoted as $U1, U2, \ldots, Um$. Also in FIG. 3, the output values of the nodes of the intermediate layer are denoted as $Z1, Z2, \ldots, Zm$. The input value $Uj$ of each node in the intermediate layer is calculated as a sum of the values obtained by multiplying each of the input values X1, X2, ..., Xn of the input layer by a weight Wij. The output values Z1, Z2, ..., Zm of the nodes in the intermediate layer are each calculated as the return value of the activation function F with the input value Uj of the corresponding node as an argument. In the present embodiment, a sigmoid function is used as the activation function F.

In FIG. 3, the output of the output layer is denoted as Y. As the output Y, the sum of the values obtained by multiplying each of the output values Zj of the nodes of the intermediate layer by the weight Vj. The value of the output Y indicates the pump rotational speed Np that is the rotational speed of the pump gear of the oil pump 20.

Learning of Neural Network

Next, a method of generating such a neural network 33, that is, learning of the neural network 33 will be described. The learning of the neural network 33 is performed using a computer for learning.

Learning of the neural network 33 is performed using teacher data obtained by measurement in a plurality of vehicles 10. The teacher data includes the measured values of the pump discharge pressure P, the measured values of the pump rotational speed Np, the oil temperature THO, and the speed change flow rate Q at the time of measurement. The teacher data also includes the measured values of the oil temperature retention times T1 to Tk at the time of measurement of the respective measured values and the measured values of the clearances C1, C2, and C3 of the transmission 12 for which the measurements are performed. The learning of the neural network 33 is performed using a large number of pieces of teacher data measured in this manner. Specifically, first, the measured values of the pump discharge pressure P, the oil temperature THO, the oil temperature retention times T1 to Tk, the speed change flow rate Q, and the clearances C1, C2, and C3 in the teacher data are input to the input layer of the neural network 33 as the values of X1 to Xn. Then, the values of the weights Wij and Vj are corrected using an error back propagation method such that the error between the value of Y output by the neural network 33 with respect to the inputs and the measured value of the pump rotational speed Np in the teacher data is reduced. The process of correcting the weights Wij and Vj is repeated until the error becomes equal to or less than a predetermined value. When the error is equal to or less than the predetermined value, it is determined that the learning of the neural network 33 has been completed. The neural network 33 thus learned is stored in advance in the memory 32 of the transmission control device 30.

Estimation of Leakage Degree of Oil

The transmission control device 30 uses the neural network 33 to estimate the leakage degree of oil in the hydraulic circuit 13. Hereinafter, details of the processing of the transmission control device 30 related to the estimation of the leakage degree of oil will be described.

Figure 4:
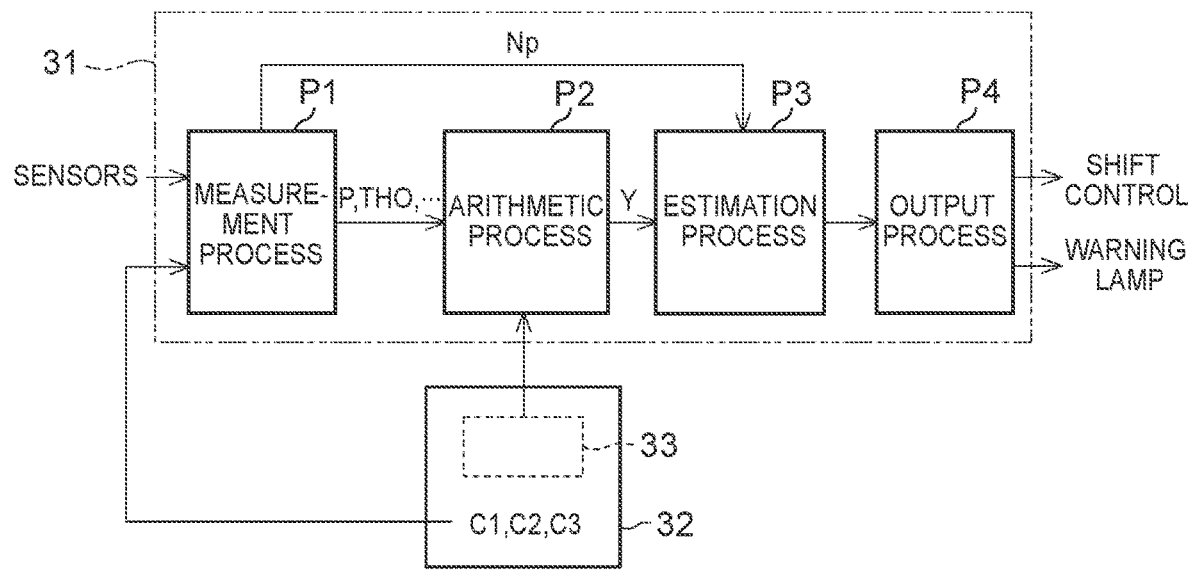
FIG. 4 is a control block diagram showing a flow of processes executed by the transmission control device.

FIG. 4 shows the flow of processing of the transmission control device 30 related to the estimation of the leakage degree of oil. As shown in FIG. 4, through a measurement process P1, an arithmetic process P2, an estimation process P3, and an output process P4, the transmission control device 30 estimates the leakage degree of oil of the hydraulic circuit 13. The series of processes shown in FIG. 4 is executed when a predetermined execution condition is satisfied. The fact that the pump discharge pressure P is less than the regulator pressure is included in the requirements for satisfying the execution condition. That is, only when the pump rotational speed Np and the pump discharge pressure P are in a proportional relationship, the series of processes shown in FIG. 4 is executed. Further, the fact that the oil temperature THO is equal to or higher than a predetermined temperature, the fact that the input rotational speed NIN and the output rotational speed NOUT are stable, and the like are also included in the requirements for satisfying the execution condition.

In the measurement process P1, the outputs of the hydraulic pressure sensor 24, the oil temperature sensor 25, and the rotational speed sensors 34 and 35 are read. Then, the measured value of the pump discharge pressure P is obtained from the output of the hydraulic pressure sensor 24. The measured value of the oil temperature THO is obtained from the output of the oil temperature sensor 25. The measured value of the pump rotational speed Np is obtained from the output of the rotational speed sensor 34. Further in the measurement process P1, the measured values of the oil temperature retention times T1 to Tk and the speed change flow rate Q that are measured by the transmission control device 30 and the clearances C1, C2, and C3 stored in the memory 32 are read.

Note that in the pump discharge pressure P of the gear-type oil pump 20, periodical pulsation occurs. The pulsation period of the pump discharge pressure P is a value proportional to the pump rotational speed Np. In the present embodiment, for the measurement of the pump discharge pressure P, a filtering process in accordance with the pump rotational speed Np is performed on the output of the hydraulic pressure sensor 24. The measured value of the pump discharge pressure P is obtained using the value obtained by smoothing the pulsation component in the filtering process.

In the arithmetic process P2, calculation of the pump rotational speed Np is performed using the neural network 33. In the arithmetic process P2, first, the measured values of the pump discharge pressure P, the oil temperature THO, the oil temperature retention times T1 to Tk, the speed change flow rate Q, and the clearances C1, C2, and C3 obtained through the measurement process P1 are input as the values of X1 to Xn for the input layer of the neural network 33. The value of the output Y of the neural network 33 for those inputs is then calculated.

In the estimation process P3, the leakage degree of oil of the hydraulic circuit 13 is estimated based on the measured value of the pump rotational speed Np in the measurement process P1 and the calculated value of the output Y of the neural network 33 in the arithmetic process P2. In the estimation process P3, the transmission control device 30 calculates a difference $\Delta N$ obtained by subtracting the calculated value of the output Y from the measured value of the pump rotational speed Np. The transmission control device 30 stores a data pair [$\Delta N$, P] of the calculated value of the difference $\Delta N$ and the measured value of the pump discharge pressure P in the measurement process P1 in the memory 32. Further, the transmission control device 30 repeats the above processes until the number of data pairs [$\Delta N$, P] stored in the memory 32 in the current trip reaches a predetermined number A. Thereafter, based on the A data pairs [$\Delta N$, P] stored in the memory 32, the transmission control device 30 estimates the leakage degree of oil of the hydraulic circuit 13.

Figure 5:
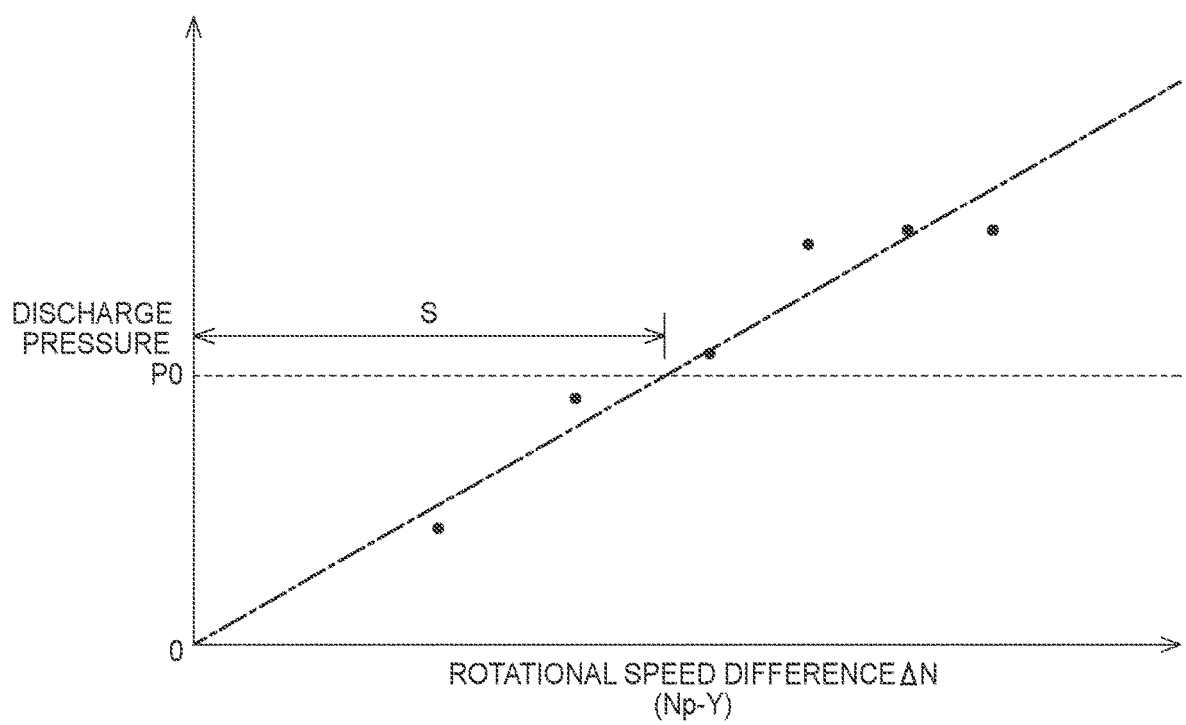
FIG. 5 is a graph showing a mode of estimation of the leakage degree of oil in an estimation process executed by the transmission control device.

FIG. 5 is a plot of the A data pairs [$\Delta N$, P] stored in the memory 32 in a rectangular coordinate system having the difference $\Delta N$ and the pump discharge pressure P as the coordinate axes. In FIG. 5, a case where the value of A is "6" is shown. In the estimation process P3, using the least squares method and the like, the slope of the approximate straight line of the A data pairs [$\Delta N$, P] is obtained. Then, the value of $\Delta N$ at a predetermined reference discharge pressure P0 on the approximate straight line is calculated as a value of an oil leakage degree S that is an index value of the leakage degree of oil. Then, in the output process P4, the calculated value of the oil leakage degree S is output.

The value of the oil leakage degree S output in the output process P4 is incorporated in the shift control of the transmission 12 performed by the transmission control device 30. Specifically, when the oil leakage degree S is equal to or greater than a predetermined determination value S1, the shift map used for determining the target gear stage is switched. The shift map after switching is set such that the switching of the gear stage is performed at a higher vehicle speed V than in the case where the target gear stage is determined using the shift map before switching.

When the oil leakage degree S is equal to or greater than a predetermined determination value S2, the occupant of the vehicle 10 is notified that maintenance of the transmission 12 is necessary, with lighting of a warning lamp, for example. The determination value S2 is set to a value slightly smaller than the value of the oil leakage degree S when the oil leakage of the hydraulic circuit 13 has progressed to a state in which the shift operation of the speed change mechanism 22 cannot be completed within an allowable time. A positive value smaller than the determination value S2 is set as the determination value S1.

Operation and Effects of Present Embodiment

Operations and effects of the present embodiment will be described. In the gear-type oil pump 20, the pump discharge flow rate that is the discharge flow rate of oil is proportional to the pump rotational speed Np. Therefore, when the viscosity of oil is constant and the oil leakage of the hydraulic circuit 13 is "0", the pump rotational speed Np and the pump discharge pressure P are in the proportional relationship.

When the oil leakage of the hydraulic circuit 13 occurs, the pump discharge pressure P is less likely to increase. Thus, when the oil leakage of the hydraulic circuit 13 progresses, the relationship between the pump rotational speed Np and the pump discharge pressure P also changes. However, the oil discharge characteristics of the oil pump 20 have individual differences due to machining tolerances and the like. In addition, the relationship between the pump rotational speed Np and the pump discharge pressure P also changes depending on factors other than oil leakage. For example, the relationship between the pump rotational speed Np and the pump discharge pressure P also changes due to a change in viscosity of oil due to the oil temperature THO or deterioration. Further, the relationship between the pump rotational speed Np and the pump discharge pressure P also changes depending on the pressure loss when the oil flows through the hydraulic circuit 13 and variations in cylinder volume of the frictional engagement elements and the like due to machining tolerances.

In contrast, in the present embodiment, the leakage degree of oil is estimated using the neural network 33. Learning of the neural network 33 is performed using, as the teacher data, the measured values of the following state quantities in the plurality of transmissions 12 in which the oil leakage is within the allowable range, that is, the measured values of the pump rotational speed Np, the pump discharge pressure P, the oil temperature THO, the oil temperature retention times T1 to Tk, the speed change flow rate Q, and the clearances C1, C2, and C3. When the state in which the oil temperature THO is high continues for a long time, deterioration of the oil progresses. Therefore, the oil temperature retention times T1 to Tk are index values of the degree of progress of oil deterioration. Further, the speed change flow rate Q decreases with increase in pressure loss of the hydraulic circuit 13, and also decreases with increase in cylinder volume of the frictional engagement elements. Furthermore, with the variations in the clearances C1, C2, and C3 due to machining tolerances, the flow resistance of oil in the hydraulic circuit 13 changes.

In the present embodiment, the value of the output Y of the neural network 33 is calculated using, as the inputs, the measured values of the pump discharge pressure P, the oil temperature THO, the oil temperature retention times T1 to Tk, the speed change flow rate Q, and the clearances C1, C2, and C3. The value of the output Y thus calculated is a value indicating the pump rotational speed Np at which the current pump discharge pressure P is obtained when the oil leakage of the hydraulic circuit 13 is assumed to be within an allowable range. Moreover, the value reflects the influence of the change in oil viscosity due to the oil temperature THO and deterioration, the variations in the flow resistance of oil in the hydraulic circuit 13, and the variations in the cylinder volume. Therefore, the difference $\Delta N$ obtained by subtracting the calculated value of the output Y from the detected value of the actual pump rotational speed Np is an index value of the progress in the oil leakage of the hydraulic circuit 13 due to deterioration over time.

In the present embodiment, when it is confirmed that the oil leakage has progressed to some extent based on the value of the difference $\Delta N$, the shift map used for the shift control is switched. Thus, the gear stage is switched at a higher vehicle speed V than before. When the vehicle speed V increases, the pump rotational speed Np increases and the pump discharge pressure P also increases. Therefore, it becomes easy to secure the hydraulic pressure required for quick switching of the gear stage even when the oil leakage has progressed.

Furthermore, when it is confirmed from the value of the difference $\Delta N$ that the oil leakage has progressed to a degree immediately before the degree at which the shift operation cannot be completed within an allowable time, the occupant of the vehicle 10 is notified that maintenance of the transmission 12 is necessary. The notification can be carried out at an appropriate timing at which maintenance of the transmission 12 becomes necessary.

In the present embodiment, the pump rotational speed Np corresponds to the state quantity indicating the discharge flow rate of oil of the oil pump 20, and the pump discharge pressure P corresponds to the state quantity indicating the discharge pressure of oil of the oil pump 20. In the present embodiment, the pump discharge pressure P is used as the input-side evaluation state quantity. The pump rotational speed Np is used as the output-side evaluation state quantity. In addition, in the present embodiment, the oil temperature THO and the oil temperature retention times T1 to Tk are used as a viscosity state quantity that is a state quantity correlating to the viscosity of oil.

With the transmission control device 30 of the present embodiment described above, the following effects can be achieved.

(1) In the present embodiment, learning of the neural network 33 is performed using, as the teacher data, the measured values of the pump rotational speed Np and the pump discharge pressure P of the transmission 12 in which the oil leakage is within an allowable range. Then, based on the difference ΔN obtained by subtracting the measured value of the pump rotational speed Np from the calculated value of the output Y of the neural network 33 having the measured value of the pump discharge pressure P as an input, the leakage degree of oil of the hydraulic circuit 13 is estimated. The calculated value of the output Y indicates the value of the pump rotational speed Np at which the current pump discharge pressure P is obtained when the oil leakage is assumed to be within an allowable range. Thus, based on the difference ΔN obtained by subtracting the pump rotational speed Np from the calculated value of the output Y, it is possible to accurately estimate the leakage degree of oil of the hydraulic circuit 13.

(2) The oil temperature THO and the oil temperature retention times T1 to Tk are included in the inputs of the neural network 33. Therefore, the value of the output Y can be calculated as the value that reflects the influence of the oil viscosity on the relationship between the pump discharge pressure P and the pump rotational speed Np. That is, the leakage degree of oil can be estimated by incorporating the influence of the viscosity of oil on the relationship between the pump rotational speed Np and the pump discharge pressure P.

(3) The speed change flow rate Q and the clearances C1, C2, and C3 are included in the inputs of the neural network 33. Therefore, the value of the output Y can be calculated as the value that reflects the influence of the flow resistance of oil in the hydraulic circuit 13 and the variations in the cylinder volume on the relationship between the pump discharge pressure P and the pump rotational speed Np. That is, the leakage degree of oil can be estimated in a state in which the influence of the flow resistance and the variations in the cylinder volume on the relationship between the pump discharge pressure P and the pump rotational speed Np is incorporated.

(4) The measured value of the pump discharge pressure P is obtained using the value obtained by performing the filtering process on the output of the hydraulic pressure sensor 24. Therefore, it is possible to suppress decrease in estimation accuracy of the leakage degree of oil due to the influence of pulsation of the pump discharge pressure P.

(5) When the oil temperature THO is low, the viscosity of oil becomes high and oil leakage is less likely to occur. Therefore, when the oil temperature THO is low, the influence of the leakage degree of oil becomes difficult to appear in the relationship between the pump rotational speed Np and the pump discharge pressure P, so it is difficult to accurately estimate the leakage degree of oil based on the relationship. In this regard, in the present embodiment, the leakage degree of oil is estimated when the oil temperature THO is equal to or higher than a predetermined temperature. That is, the estimation accuracy of the leakage degree of oil is ensured by avoiding execution of the estimation in the situation where the accurate estimation is difficult.

OTHER EMBODIMENTS

The present embodiment can be modified to be implemented as follows. The present embodiment and modifications described below may be carried out in combination within a technically consistent range.

Figure 6:
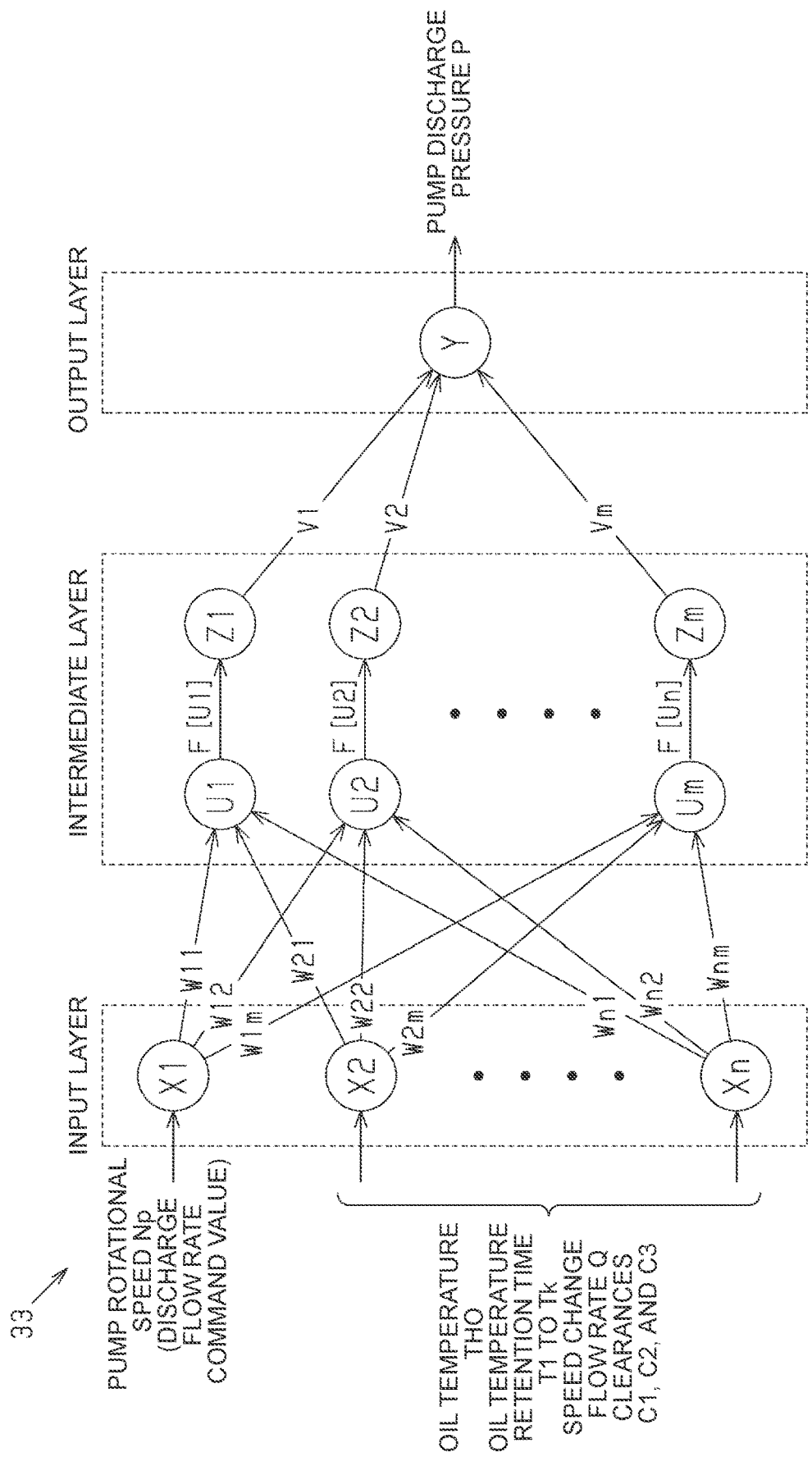
FIG. 6 is a diagram schematically showing a configuration of a neural network that another embodiment of the transmission control device uses to estimate the leakage degree of oil.

The neural network 33 may be configured as shown in FIG. 6. That is, the neural network 33 may be configured such that the pump rotational speed Np serves as the input and the pump discharge pressure P serves as the output. The calculated value of the output Y of the neural network 33 in such a case indicates the value of the pump discharge pressure P obtained at the current pump rotational speed Np when the oil leakage of the hydraulic circuit 13 is assumed to be within an allowable range. Therefore, the measured value of the pump discharge pressure P when the oil leakage occurs is smaller than the calculated value of the output Y. Therefore, also based on the difference ΔP obtained by subtracting the measured value of the pump discharge pressure P from the calculated value of the output Y, the leakage degree of oil of the hydraulic circuit 13 can be estimated.

Some transmissions 12 adopt a variable displacement pump with a pump discharge flow rate that is variable in accordance with the command. With such a variable displacement pump, the pump discharge flow rate cannot be determined from the pump rotational speed Np. Thus, when a variable displacement pump is adopted, the neural network 33 may be configured such that the command value of the pump discharge flow rate serves as the input or output, instead of the pump rotational speed Np. Further, also when the oil pump 20 of a gear type and the like in which the pump discharge flow rate is proportional to the pump rotational speed Np is adopted, the neural network 33 may be configured such that the pump discharge flow rate serves as the input or output, instead of the pump rotational speed Np. In that case, it is necessary to install a sensor for detecting the pump discharge flow rate in the hydraulic circuit 13.

In the above embodiment, the leakage degree of oil is estimated from the plurality of measurement results of the pump rotational speed Np and the pump discharge pressure P. However, the estimation may be performed from one measurement result. In that case, it is difficult to obtain the approximate straight line as shown in FIG. 5 accurately. Therefore, in such a case, the values of the determination values S1 and S2 may be set to be variable in accordance with the pump rotational speed Np or the pump discharge pressure P. That is, the values of the determination values S1 and S2 are set in accordance with the pump rotational speed Np such that the values are larger when the pump rotational speed Np is high than when the pump rotational speed Np is low. Alternatively, the values of the determination values S1 and S2 are set in accordance with the pump discharge pressure P such that the values are larger when the pump discharge pressure P is high than when the pump discharge pressure P is low.

In the above embodiment, the oil temperature retention times T1 to Tk for the temperature ranges are used as the index values of the deterioration degree of oil. The oil temperature retention times T1 to Tk for the temperature ranges may be converted into the oil temperature retention times in a specific temperature range, and the sum of the converted values may be used as an index value of the deterioration degree of oil. In such a case, the number of nodes in the input layer of the neural network 33 is reduced, and accordingly, the load on the arithmetic processing circuit 31 required for the calculation of the output Y in the arithmetic process P2 is reduced.

The state quantity other than the oil temperature retention times may be used as the index value of the deterioration degree of oil. For example, the period from the start of use of oil to the present time or the travel distance of the vehicle 10 after the start of use of oil may be used as the index value of the deterioration degree of oil.

The number and positions of the clearances C1, C2, and C3 serving as the inputs of the neural network 33 may be appropriately changed.

One or more of the oil temperature THO, the index values of the deterioration degree of oil such as the oil temperature retention times T1 to Tk, the speed change flow rate Q, and the clearances C1 to C3 may be omitted from the inputs of the neural network 33. Further, other state quantities that affects the relationship between the pump discharge flow rate and the pump discharge pressure P may be added to the inputs of the neural network 33.

A plurality of intermediate layers may be provided in the neural network 33. In addition, the configuration of the neural network 33 may be appropriately changed using a function other than the sigmoid function as the activation function, for example.

Part of the processes shown in FIG. 4 may be performed by a computer device outside the vehicle installed in a facility such as a data center. In this case, the electronic control unit of the vehicle 10 performs the measurement process P1, and transmits the measured values to the computer device outside the vehicle through a wide area communication network such as a mobile phone network. The computer device outside the vehicle executes the arithmetic process P2 and the estimation process P3 based on the received measured values, and transmits the estimation result of the leakage degree of oil to the electronic control unit of the vehicle 10 in the output process P4. Then, based on the received estimation result of the leakage degree, the electronic control unit of the vehicle 10 performs switching of the shift map and lighting of the warning lamp or the like. The transmission control device 30 in such a case is composed of the electronic control unit of the vehicle 10 and the computer device outside the vehicle.

The transmission control device 30 of the above embodiment may be applied to a transmission of a type different from the transmission 12 of the above embodiment such as a hydraulically driven continuously variable transmission.

What is claimed is:

1. A transmission control device for controlling a transmission mounted on a vehicle and equipped with a hydraulic circuit including an oil pump, a speed change mechanism that operates by receiving supply of oil to perform a shift operation of the transmission, and a hydraulic pressure control mechanism that controls an amount of oil supplied from the oil pump to the speed change mechanism, the transmission control device comprising:
an execution device; and
a storage device,
wherein one of a state quantity indicating a discharge flow rate of oil of the oil pump and a state quantity indicating a discharge pressure of oil of the oil pump is an input-side evaluation state quantity and another is an output-side evaluation state quantity,
a neural network having the input-side evaluation state quantity as an input and the output-side evaluation state quantity as an output is stored in the storage device,
learning of the neural network is performed using, as teacher data, a measured value of the input-side evaluation state quantity in the transmission in which a leakage degree of oil is within an allowable range and a measured value of the output-side evaluation state quantity at a time of measurement of the input-side evaluation state quantity, and
wherein the execution device executes
a measurement process of measuring the input-side evaluation state quantity and the output-side evaluation state quantity,
an arithmetic process of calculating an output of the neural network using the measured value of the input-side evaluation state quantity in the measurement process as the input,
an estimation process of estimating the leakage degree of the hydraulic circuit based on a difference between a calculated value of the output of the neural network in the arithmetic process and the measured value of the output-side evaluation state quantity in the measurement process, and
an output process of outputting an estimation result of the leakage degree in the estimation process.

2. The transmission control device according to claim 1, wherein the state quantity indicating the discharge flow rate of oil of the oil pump is a rotational speed of the oil pump.

3. The transmission control device according to claim 1, wherein:
the oil pump is a variable displacement pump configured to change the discharge flow rate of oil in accordance with a command; and
the state quantity indicating the discharge flow rate of oil of the oil pump is a command value of the discharge flow rate.

4. The transmission control device according to claim 1, wherein:
the input of the neural network includes a viscosity state quantity that is a state quantity correlating to a viscosity of oil;
the teacher data includes the input-side evaluation state quantity included in the teacher data and a measured value of the viscosity state quantity at a time of measurement of a value of the output-side evaluation state quantity;
in the measurement process, measurement of the value of the viscosity state quantity is also performed; and
a value input to the neural network for calculation in the arithmetic process includes a measured value of the viscosity state quantity in the measurement process.

5. The transmission control device according to claim 4, wherein the viscosity state quantity is a temperature of oil.

6. The transmission control device according to claim 4, wherein the viscosity state quantity is a state quantity indicating a deterioration degree of oil.

7. The transmission control device according to claim 6, wherein the state quantity indicating the deterioration degree is a retention time of the temperature of oil for each of temperature ranges after start of use of oil.

8. The transmission control device according to claim 1, wherein:
the input of the neural network includes a value of a clearance between components of the hydraulic circuit;
the teacher data includes the input-side evaluation state quantity in the teacher data and a measured value of the clearance of the transmission for which the measured value of the output-side evaluation state quantity is measured;
the measured value of the clearance of the transmission for which the transmission control device estimates the leakage degree in the estimation process is stored in the storage device; and
a value input to the neural network for calculation in the arithmetic process includes the measured value of the clearance stored in the storage device.

9. The transmission control device according to claim 1, wherein:
the input of the neural network includes a speed change flow rate that is a flow rate of oil reaching the speed change mechanism during the shift operation;

the teacher data includes the input-side evaluation state quantity in the teacher data and a measured value of the speed change flow rate of the transmission for which a value of the output-side evaluation state quantity is measured; and
a value input to the neural network for calculation in the arithmetic process includes the measured value of the speed change flow rate of the transmission for which the transmission control device estimates the leakage degree in the estimation process.

* * * * *